United States Patent [19]

Wines et al.

[11] 3,971,969

[45] July 27, 1976

[54] ELECTRICALLY OPERATED STAPLING DEVICE

[75] Inventors: Harry T. Wines, Flushing; John J. Power, Westbury; Gilbert Knauer, Oceanside, all of N.Y.

[73] Assignee: Swingline, Inc., Long Island City, N.Y.

[22] Filed: Oct. 2, 1974

[21] Appl. No.: 511,254

[52] U.S. Cl. .................... 317/148.5 B; 307/252 N; 310/30

[51] Int. Cl.² .................... H01H 47/32

[58] Field of Search .................... 310/30; 307/252 N; 318/125; 227/131; 317/148.5 B

[56] References Cited

UNITED STATES PATENTS

| | | | |
|---|---|---|---|
| 2,866,973 | 1/1959 | Ruskin | 227/128 |
| 3,179,866 | 4/1965 | Doyle et al. | 318/125 |
| 3,215,864 | 11/1965 | Doyle et al. | 227/131 |
| 3,267,337 | 8/1966 | Doyle et al. | 317/148.5 |
| 3,347,438 | 10/1967 | Doherty | 227/131 |
| 3,347,441 | 10/1967 | Doherty | 227/131 |
| 3,434,026 | 3/1969 | Doyle | 318/125 |
| 3,460,173 | 8/1969 | Stuertz | 11/1 |
| 3,469,122 | 9/1969 | Doherty | 310/30 |
| 3,482,754 | 12/1969 | Doherty | 227/131 |
| 3,524,575 | 8/1970 | Hurkmans et al. | 227/7 |
| 3,662,190 | 5/1972 | Naber | 307/252 N |
| 3,715,605 | 2/1972 | Naber | 307/252 N |

*Primary Examiner*—J D Miller
*Assistant Examiner*—Harry E. Moose, Jr.
*Attorney, Agent, or Firm*—Pennie & Edmonds

[57] ABSTRACT

An electrically operated stapling device is disclosed. Staples are driven into the article to be stapled by a simple driver blade which is powered by a current actuated solenoid. In the preferred embodiment, the solenoid is provided with a plurality of pulses which are derived from alternate half-cycles of an AC power source which powers the stapling device. The circuit produces two pulses by defining a window in each of the successive output cycles of the power source. The current then initiates the generation of an enabling signal which lasts for a predetermined period of time which begins during the window. During this period of time, alternate half-cycles of the power source are coupled to the solenoid, thereby causing the driver blade to drive the staple into the article to be stapled.

11 Claims, 5 Drawing Figures

87 75 84 88 83 74 81 82 79 86 85 76 71 70 57 61 60 56 58 54 53 22 38 55 50 59 62 37 66 78 77 67 89 73 65 23 63 64 80 72 20 69

ELECTRICALLY OPERATED STAPLING DEVICE

BACKGROUND OF THE INVENTION

This invention relates to electrically operated stapling devices and, more particularly, to devices in this category which are provided with electronic control circuitry for supplying unidirectional electronic impulses for operating the staple driving blade of the device.

Electrically operated stapling devices are disclosed in U.S. Pat. Nos. 3,179,866, 3,347,441, 3,347,438, 3,469,122, 3,482,754 and 3,524,575. Electronic control circuits for operating such stapling devices as that of U.S. Pat. No. 3,179,866 are described and claimed in the U.S. Pat. Nos. 3,215,864 and 3,267,337. The aim of the latter is to supply the solenoid coil which actuates the staple driver blade with a unidirectional electric pulse derived from not more than one cycle of an alternating current source. The rationale of such a concept is that this single-cycle pulse is of sufficiently short duration to operate the driver blade without interfering with its return to the retracted position, thereby insuring the driving of only a single staple during a discrete period of operation of the stapling device.

SUMMARY OF THE INVENTION

It has now been discovered that more advantageous operation of the driver blade of an electrically controlled stapling device may be accomplished by using a predetermined number of pulses as the driving energy source. In the preferred embodiment, a predetermined number, preferably two, of unidirectional pulses derived from a determined number, preferably a minimum of two, of successive cycles of an alternating current source are used.

As a result of such a multiple pulse system, the following objectives have been met:

1. The blade-operating solenoid coil which varies the pulses and drives the blade requires less amperage from the line and thus the drop in line voltage is minimal. This is in contrast to prior art systems which subjected power lines to severe instantaneous overloads with their resultant excessive reductions in line voltage.

2. The multiple pulses delivered to the coil actually cause the driver in the stapling head to hit the staple a number of times, thus hammering the staple into the work.

3. Quieter machine operation has also been achieved. Although the stapling head hits the staple a number of times, the individual hits are not discernible due to the proximity in time of the the pulses. Rather, the decrease of force of impact accounts for a decrease in noise. It has been estimated that the inventive stapler is approximately 25 to 30% quieter than a comparable single pulse machine.

Thus, the present invention resides in an improvement in electrically actuated and electronically controlled stapling devices comprising a staple driver blade and a spring member adapted to bias the driver blade in a direction opposite to its stapling direction. A solenoid having a coil and an armature is used as a source of motive power. The armature is interconnected with and adapted to move the driver blade in a staple-driving direction when electric current is passed through the coil. An electronic pulser circuit is connected to the solenoid and adapted to supply the solenoid with unidirectional current from a source of alternating current supplied to the pulser circuit. Pursuant to the invention, the pulser circuit is adapted to produce a pulse output from at least two cycles of the alternating current source supplied to the circuit. The magnitude of the pulse output from the pulser circuit is such with respect to the output of the coil, the driver blade spring bias and the combined mass of the interconnected armature and the driver blade as to impart its pulse output to driving the blade substantially only during its movement in a staple-driving direction.

DETAILED DESCRIPTION OF THE PREFERRED EMBODIMENT

Figure 1:
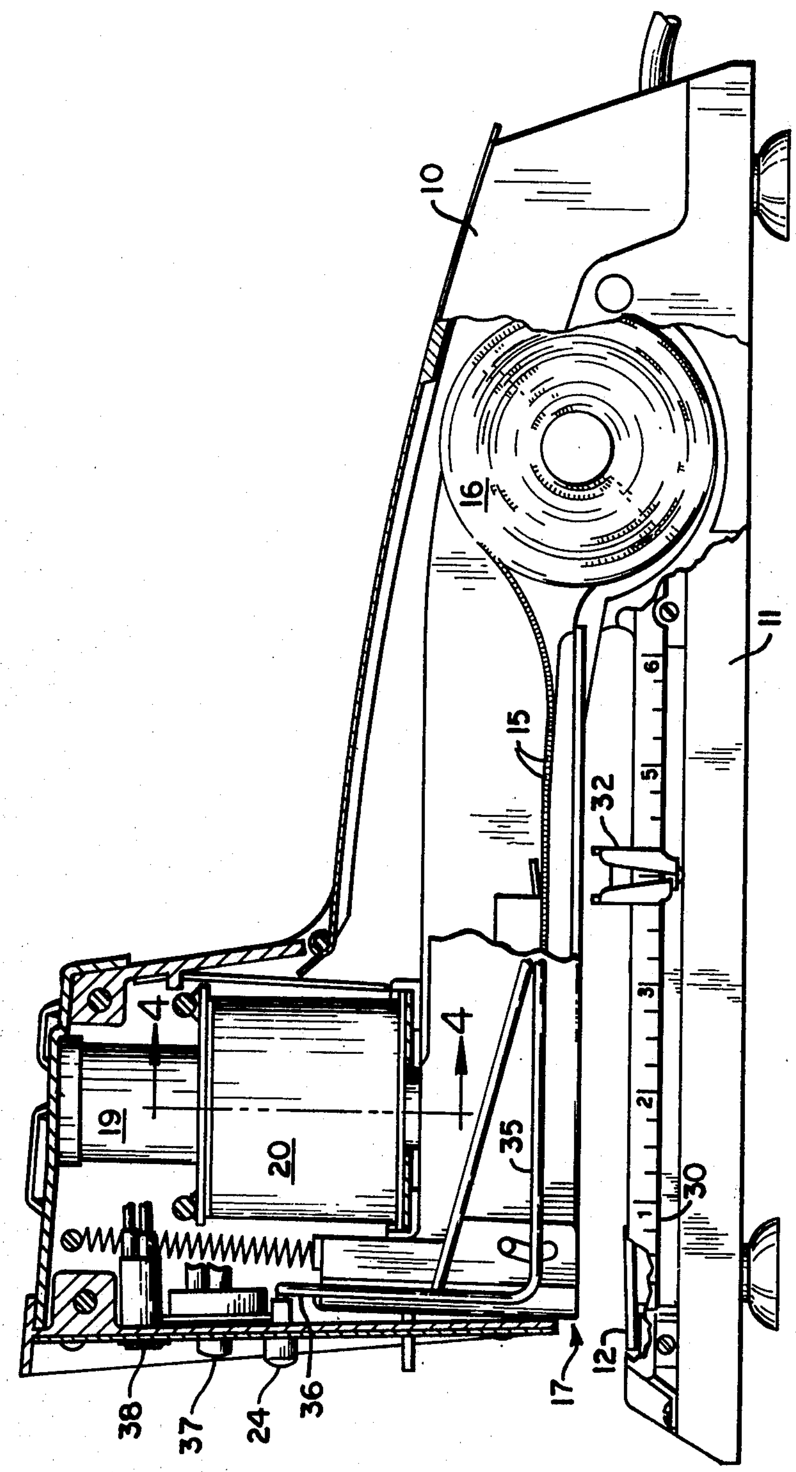
FIG. 1 is a side elevational view, partly in section, of the structure of an electrically operated and electronically controlled stapling device constructed in accordance with the present invention.

The advantages of the present invention may be achieved by coupling the inventive pulser circuit to any of a number of prior art electrically operated stapling devices. Thus, the mechanics of the electrically operated and electronically controlled stapling device of the present invention may be substantially identical in structure to a stapler such as the stapler shown in U.S. Pat. No. 3,524,575. Referring to FIGS. 1–4, the device comprises a housing 10 for the operating mechanism and a base 11. The base carries an anvil 12 against which a driving blade 13 presses a staple during each downward stroke of the blade. Adjacent the driving blade 13 is a forming blade 14 which forms a conventional U-shaped staple from a straight wire staple 15 carried transversely to the forming station in the form of a roll 16 of such wire mounted in a suitable carrier base. The complete stroke of the forming blade is also accompanied by advancement of the formed staple to the head portion 17 of the device and into a position whence it can be driven against the anvil by the driving blade.

The forming blade-driving blade assembly is caused to move downwardly against the bias of the tension spring 18 by means of an armature 19 axially positioned within a solenoid coil 20 and acting downwardly on a leaf spring 21. As shown most clearly in FIG. 4, solenoid coil 20 comprises a winding **20*a*, a housing 20*b*, a tubular member 20*c*, an outer housing 20*d* and a flat annular member 20*e*. Armature 19 comrpises a main portion 19*a* and a lower portion 19*b*. Lower portion 19*b* may be made of fluorinated ethylene propylene fluoropolymer or any other suitable material. Main portion 19*a*, as well as tubular member 20*c* and flat annular member 20*e*** form the magnetic path of the coil and are made of magnetic material. The solenoid is energized by an electronic pulsing circuit 22, the operation of which is effected by work-responsive actuation of a switch 23 or by manual actuation of switch 23 by actuator 24. Actuation of the switches connects a source of alternating current to the pulsing circuit. The pulsing circuit is designed, pursuant to a preferred embodiment of the invention, to supply to the solenoid only two unidirectional pulses corresponding in timed relationship to two successive cycles of the alternating current source. Upon delivery of two pulses, the circuit ceases to conduct and will not again activate the solenoid 20 until switch 23 is again actuated.

Figure 2:
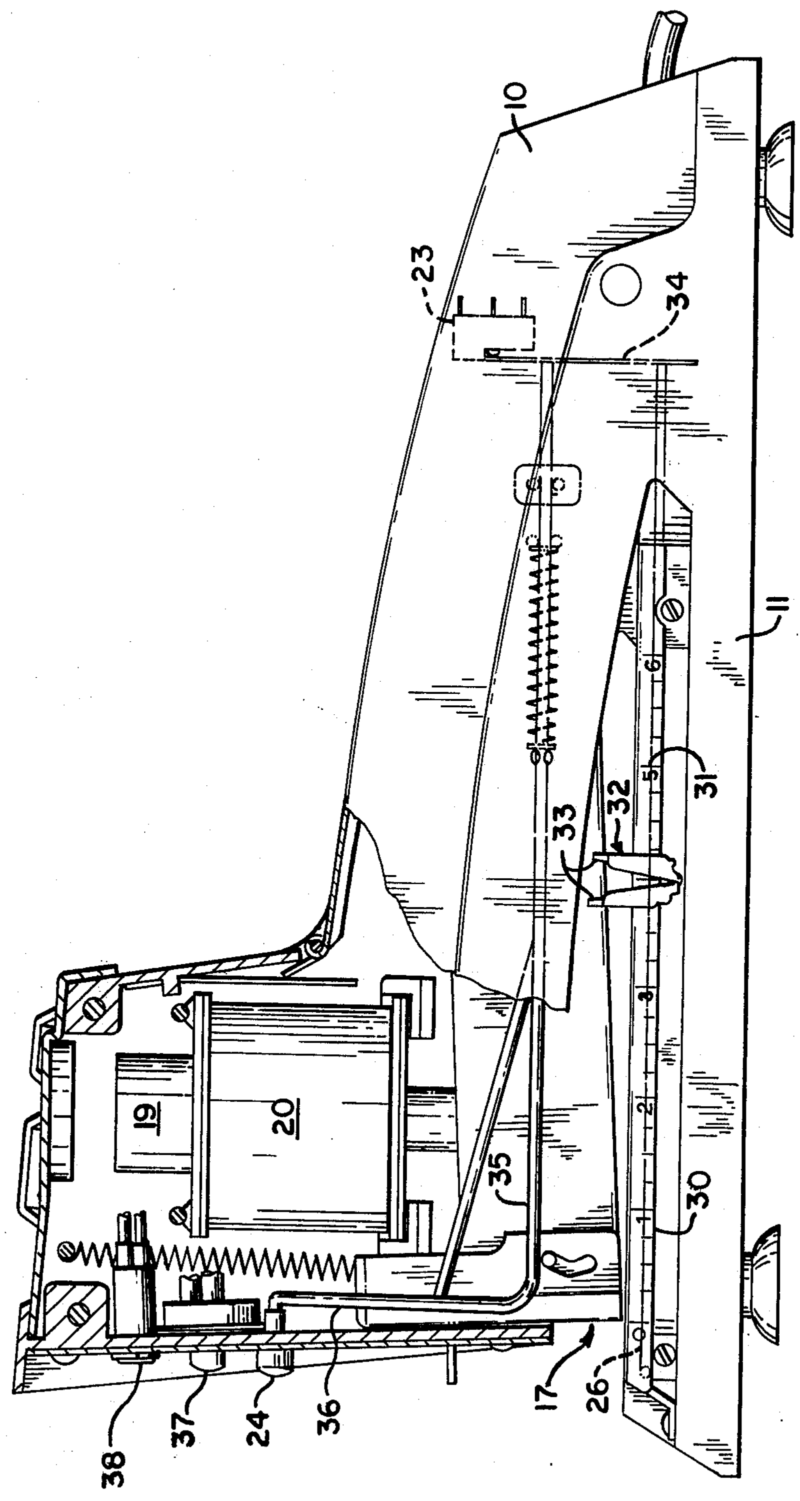
FIG. 2 is a side elevation similar to FIG. 1 showing the position of the plunger of the solenoid after it has stapled an item.
Figure 3:
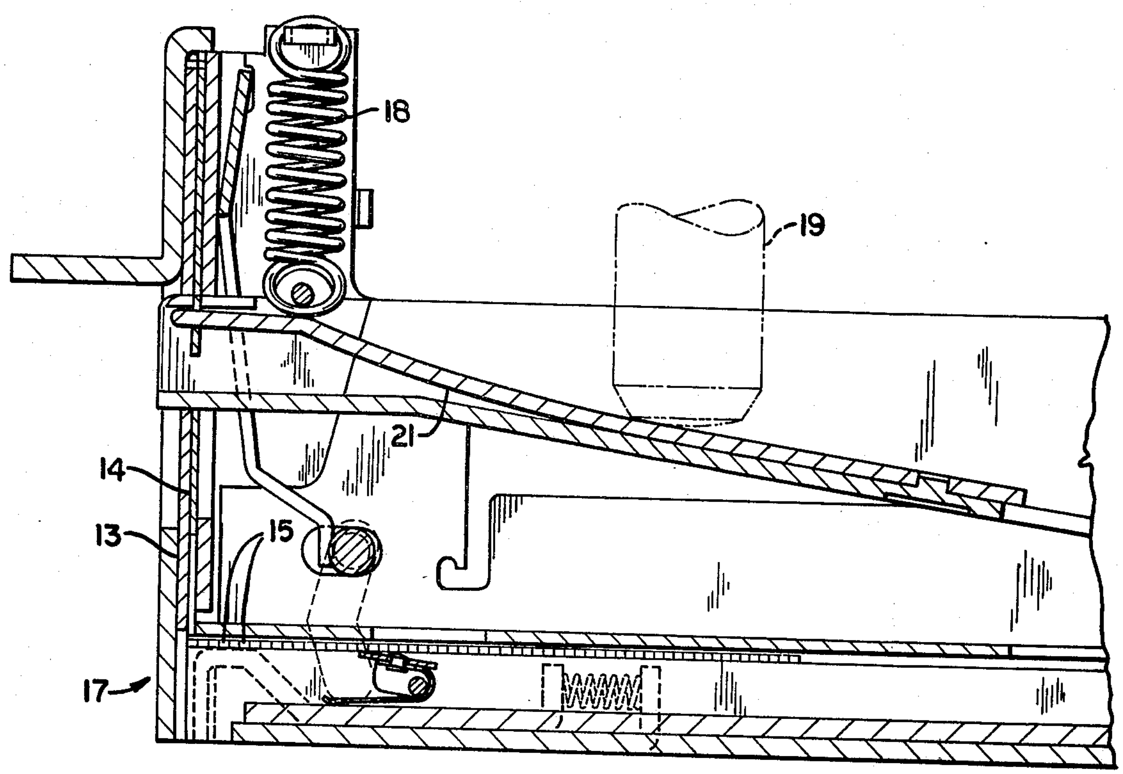
FIG. 3 is a detail fragmentary enlarged cross-sectional view through the stapling head of the device illustrated in FIG. 1 with the main arm spring removed for clarity of illustration. In this figure, the stapling head is in its normal rest position and the driving plunger of the solenoid is shown in phantom lines.

The manner in which switch 23 is actuated can be seen most clearly in FIG. 2. A trip rod 26 is spaced from a guard member 30. Guard 30 bears measuring indications 31 upon it. Lying along trip rod 26 is tripper 32 which is movable along rod 26 and retained in position thereupon by spring arms 33.

The rear portion of trip rod 26 abuts lever 34 of switch 23. Thus, movement of trip rod 26 rearwardly by advancement of an item to be stapled into the stapler will actuate switch 23. A manual trip rod 35 disposed within housing 10 includes an offset portion 36 to which is secured the forwardly projecting button of manual actuator 24.

A main on/off switch 37 may also be provided. A pilot light 38 in series with switch 37 may be used to indicate that power is applied to the machine when switch 37 is closed.

Figure 5:
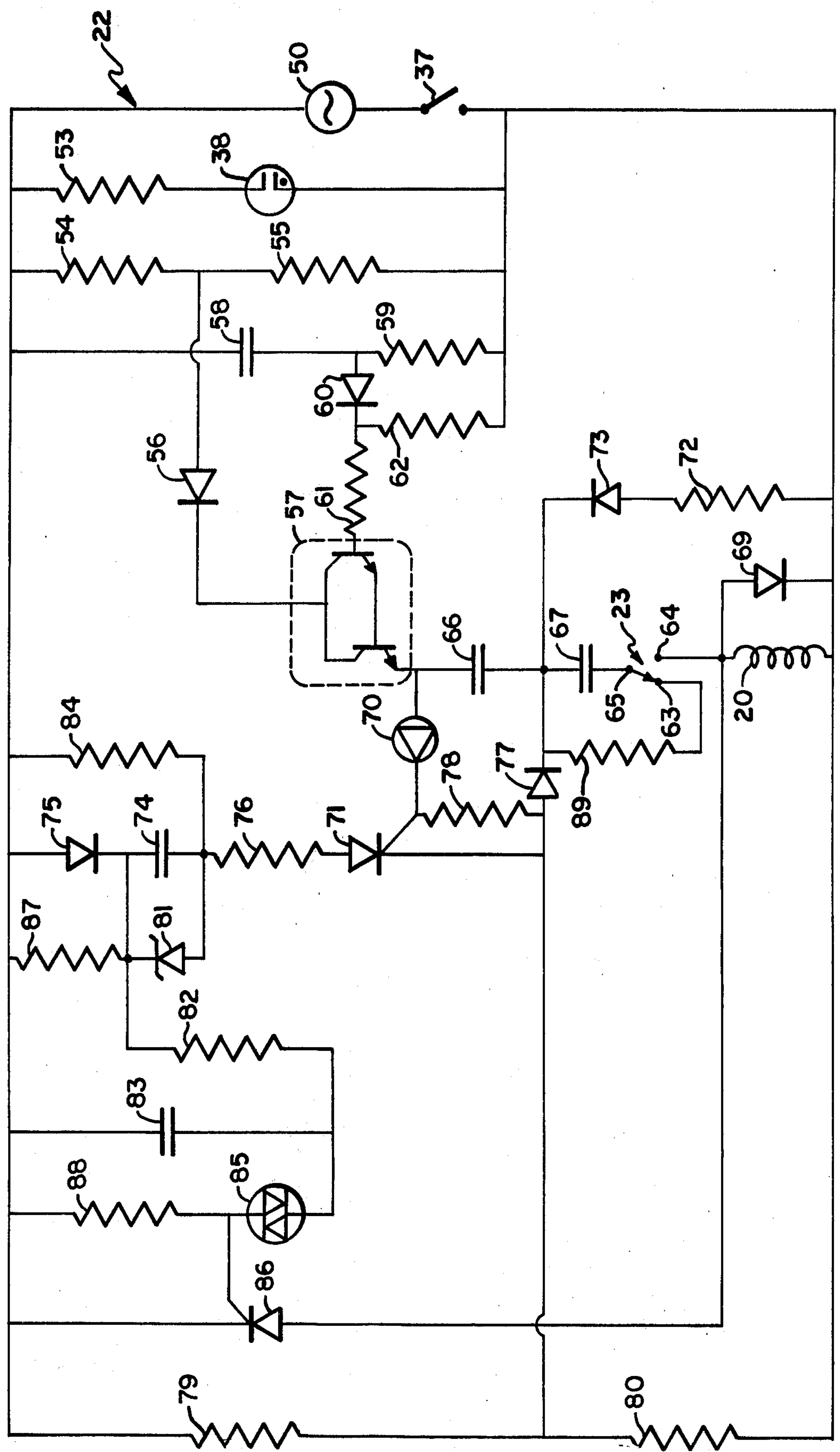
FIG. 5 is a circuit diagram of an electronic pulsing circuit constructed in accordance with the present invention.

Referring now to FIG. 5, there is shown the electrical connections of switch 23, pilot light 38 and coil 20 in the circuit diagram of the preferred electronic pulser circuit 22. Pulsing circuit 22 is supplied with power by an AC source 50 which may be a standard 115 V.A.C. power line. Power is connected to the pulsing circuit by the closure of switch 37. When switch 37 is closed, the unit is activated and that condition is signaled by pilot light 38 which, in series with a resitor 53, is placed across the AC line. Closure of switch 37 also results in the application of the line current to a voltage divider comprising resistors 54 and 55. The output of the voltage divider at the electrical connection between resistors 54 and 55 is coupled via a diode 56 to the collector of a Darlington transistor 57. Due to the action of diode 56, only positive half-cycles of the AC output of the voltage divider comprising resistors 54 and 55 are applied to Darlington transistor 57.

Figure 4:
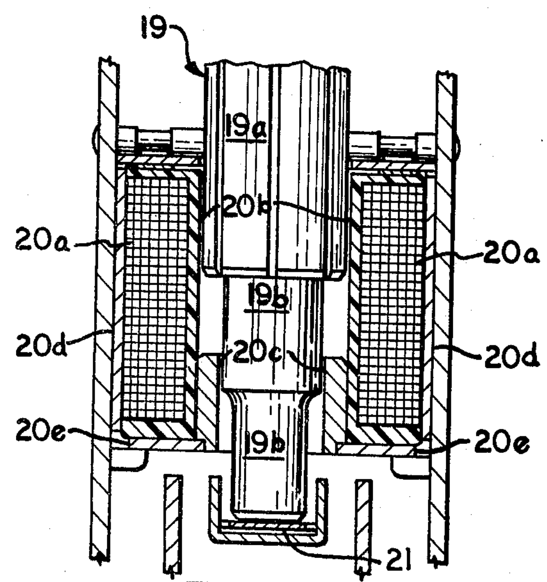
FIG. 4 is a sectional view along lines 4—4 of FIG. 1.

Voltage is also present across a phase shifting network comprising a capacitor 58 and a resistor 59. The output of the phase shifting network comprising capacitor 58 and resistor 59 is coupled via a diode 60 and a resistor 61 to the base of Darlington transistor 57. The voltage impressed on the base of Darlington transistor 57 is thus rectified and also comprises the positive half-cycles of an AC signal. The AC signal coupled is that signal which is present at the electrical connection of capacitor 58 and resistor 59. This signal is leading in voltage due to the action of the phase shifting network. In practice, it has been found desirable to make the magnitude of this lead in the order of 90°, although it is possible to maintain proper operation with some variation of this parameter. Proper biasing of Darlington transistor 57 is accomplished by connecting a resistor 62 between the junction of resistor 61 and diode 60 and the power source as illustrated in FIG. 4.

The voltage on the base of Darlington transistor 57 leads the voltage on the collector of the Darlington transistor although the voltage present on the base and collector are in origin the same alternate half-cycles of AC source 50. Darlington transistor 57 can be turned on only when both these signals coincide with each other and also have minimum values. In the preferred embodiment, this coincidence of minimum values starts about 5° or 10° past the beginning of a positive half-cycle of the input signal and ends in a little less than 90°. This results in definition of a window in the forward part of the half-cycle of the AC signal produced by AC source 50. However, even though a window is defined by Darlington transistor 57 for every positive half-cycle in the output of source 50, in order for the transistor to be saturated, it is also necessary that its emitter path be completed. Completion of the path is accomplished by switch 23. Switch 23 has a normally closed contact 63, a normally opened contact 64, and a common terminal 65. When the user wishes to staple an article, switch 23 is actuated, resulting in the connection of common terminal 65 to normally opened contact 64. The emitter path is then completed through capacitors 66 and 67, switch 23, solenoid 20 and a diode 69 to the power source. When this path is completed, the voltage present at the emitter of Darlington transistor 57 will rise in value.

The voltage output of the emitter is coupled to a silicon unilateral switch (SUS) 70. SUS 70 will couple the output voltage present at the emitter of Darlington transistor 57 to the gate of a silicon control rectifier (SCR) 71 only if that output voltage exceeds the threshold value of the SUS. Thus, if the proper window conditions are present at the base and collector of Darlington transistor 57, actuation of switch 23 will result in the coupling of a voltage to SCR 71. Successive repetition of the application of a firing voltage to SCR 71 via SUS 70 is prevented by a resistor 72 and a diode 73 which charge capacitor 67, thereby disabling Darlington transistor 57 after it has been turned on. Application of a triggering voltage to SCR 71 results in activation of SCR 71 and the nearly instantaneous charging of a capacitor 74 through the path comprising a diode 75, a resistor 76, SCR 71, a diode 77, capacitor 67, switch 23, and solenoid 20 and diode 69. Resistor 78 is connected to the gate of SCR 71 in order to reduce its sensitivity to random signals that may be present in the system. There is also a tendency for an SCR which is repeatedly coupled to a source of voltage to be driven into conduction even without a signal being placed on its base. In order to prevent this, a voltage dividing network comprising resistors 79 and 80 is connected across the power line and coupled to SCR 71 as shown in the schematic diagram. This results in maintaining a voltage across the SCR and eliminating the intermittent firing of the SCR by the power line. Resistor 76 acts as a current limiter during the charging of capacitor 74, thereby protecting SCR 71 from damage. Capacitor 74 is charged to the peak instantaneous voltage present on the power line during the window. Diode 75 prevents discharge of capacitor 74 when the polarity of source 50 reverses or its voltage output drops below its peak value.

The voltage across capacitor 74 is limited by a Zener diode 81. The voltage limiting action of Zener diode 81 serves to compensate for variations in peak line voltage, thereby insuring that a uniform charge is stored by capacitor 74. Capacitor 74 then discharges through a resistor 82, a capacitor 83, and a resistor 84. The charge stored in capacitor 74 is thus discharged through capacitor 83, thereby causing the voltage across capacitor 83 to rise. When this voltage reaches a sufficient value, it triggers a diac 85 into conduction, thereby discharging capacitor 83. Capacitor 83 is discharged to such an extent that the voltage across capacitor 83 is reduced not only below the voltage that drove diac 85 into conduction but also below the voltage needed to maintain diac 85 in conduction once it has been brought into conduction. Diac 85 therefore becomes an open circuit again. The current being discharged from capacitor 74 again begins to raise the voltage across capacitor 83. This results in, after a period of time, again driving diac 85 into conduction. This process is repeated, resulting in the production of a series of pulses being sent to the gate of an SCR 86. Due to the fact that a very precise amount of charge is stored in capacitor 74, the number of pulses sent to SCR 86 is constant. Due to the fact that the characteristics of the semi-conductor elements tend to be somewhat unstable, uniform operation is further insured by the addition of a loading resistor 87 to the circuit which loads capacitor 74. The addition of resistor 87 has been found to yield greater stability to the discharge period of capacitor 74. A resistor 88 is connected to the gate of SCR 86 in order to reduce its immunity to noise.

Thus, as discussed above, when capacitor 74 is charged, it immediately begins discharging into capacitor 83 which is periodically discharged by diac 85. This results in the production of a series of pulses which are coupled via diac 85 to SCR 86. This tends to drive SCR 86 into conduction except for the fact that SCR 86 will only conduct in one direction and capacitor 74 is charged while the current is flowing in a direction opposite to that direction. Thus, current will not begin to flow through SCR 86 until the next half-cycle begins. Once the next half-cycle has begun, the first pulse reaching the gate of SCR 86 will drive SCR 86 into conduction, thereby allowing pulses of line current to flow through stapler driving solenoid 20, thereby causing the stapler to begin the stapling operation.

Due to the fact that the charge on capacitor 74 is controlled, the number of pulses coupled to SCR 86 is also controlled and will stop when capacitor 74 no longer has enough charge remaining in it to cause oscillation. Thus, if the charge is drained off very quickly, it may cease producing pulses before the output of source 50 changes in polarity, thereby resulting in a situation where SCR 86 will never be driven into conduction. However, even if only one pulse is coupled to SCR 86 after the polarity has reversed SCR 86 will be driven into conduction and will continue to conduct until the polarity of the signal reverses. Similarly, if the loading on capacitor 74 is still further reduced, and at least a single pulse is coupled to SCR 86 the second time that the voltage output of source 50 has changed to the polarity which permits conduction by SCR 86 through solenoid 20, two successive pulses which comprise two successive half-cycles of the same polarity from source 50 will be passed through solenoid 20. Naturally, the oscillator may be allowed to produce even more pulses as long as the pulse output does not last long enough to trigger SCR 86 to pass a third half-cycle of the power source.

It is necessary that as much of the entire half-cycle of the power pulse be coupled to solenoid 20 in order that two pulses will impart sufficient energy to the solenoid to enable it to do the stapling operation. It is thus seen that the application of a relatively high frequency pulse train to SCR 86 is desirable because it will cause the SCR to go into conduction relatively early in the half-cycle, thereby causing current to flow through SCR 86 and solenoid 20 during most of the half-cycle.

The length of time during which pulses will be produced can be regulated by varying the value of resistor 84. Resistor 84 would be varied in order to insure that two driving pulses would be passed through solenoid 20 by SCR 86. In making the device, a variable resistance would be substituted for resistor 84 and would be varied to a low resistance limit which would define the margin between one pulse and two pulses and a high resistance limit which would define the margin between two pulses and three pulses. A resistor approximately in between these two values would then be permanently connected into the circuit as resistor 84. This process is necessitated by the need for a precisely timed circuit which is fabricated from electrical components having various tolerances.

Some continuity in the force produced by the two pulses is maintained by diode 69, which provides an electrical path for the current induced in the winding of solenoid 20 as the flux lines begin to fall after the first pulse ends. This retards the tendency of the solenoid to return to its non-actuated position. Thus, when the second pulse is applied to solenoid 20, its action tends to be somewhat continuous and results in a more even driving of a staple. Thus, the sequential operation of the solenoid with two pulses results in a lighter load being spread over a longer period of time without a sacrifice in the efficiency of the stapling operation. This diode also retards the return of the driver and former so that a second staple is not picked up and driven in response to the second later pulse.

Repetition of the triggering of SCR 86, as discussed above, is prevented by the application of a blocking voltage to capacitor 67. Once the item to be stapled is removed from the stapler and switch 23 is allowed to return to its non-actuated position, this results in the discharge of capacitor 67 through resistor 89, thus readying the circuit for another cycle of operation.

Although pulsing circuit 22 may be fabricated in various configurations with components of many different values and types, a suitable control circuit may be fabricated by using the listed components for the various elements in the above-described circuit

| Component | Value |
|---|---|
| Resistor 53 | 180 KΩ |
| Resistor 54 | 68 KΩ |
| Resistor 55 | 15 KΩ |
| Resistor 59 | 12 KΩ |
| Resistor 61 | 100 KΩ |
| Resistor 62 | 240 KΩ |
| Resistor 72 | 39 Ohms |
| Resistor 76 | 470 Ohms |
| Resistor 78 | 100 Ohms |
| Resistor 79 | 68 KΩ |
| Resistor 80 | 15 KΩ |
| Resistor 82 | 1 KΩ |
| Resistor 84 | 27–56 KΩ |
| Resistor 87 | 470 KΩ |
| Resistor 88 | 100 Ohms |
| Resistor 89 | 39 Ohms |
| Capacitor 58 | .047 μfd at 250VDC |
| Capacitor 66 | .02 μfd at 50V C |
| Capacitor 67 | 2.0 μfd at 250VDC |
| Capacitor 74 | .47 μfd at 100VDC |
| Capacitor 83 | .033 μfd at 50V C |
| Darlington Transistor 57 | GE 2N5308 |
| Silicon Unilateral Switch 70 | GE 2N4987 |
| SCR 71 | Motorola MOR-120 |
| SCR 86 | RCA 40654 |
| Zener Diode 81 | 82V at 1W |
| Diac 85 | GE ST-2 |
| Diode 56 | 1N 4001 |
| Diode 60 | 1N 4001 |

-continued

| | |
|---|---|
| Diode 69 | IN 4005 |
| Diode 73 | IN 4005 |
| Diode 75 | IN 4005 |
| Diode 77 | IN 4005 |
| Pilot Light 38 | NE51 |

Pursuant to the invention, the mass of the driving blade-coil armature assembly and the strength of the blade-biasing spring 18 are so chosen, in the light of the number of turns of the armature coil winding and of the amount of current supplied to the coil by the two pulses emitted by the control circuit 22, that the two pulses occur during a single driving stroke of the staple driving blade. Under these conditions, the two timed pulses exert smoother control over the driving of the stapling blade than a single pulse. In addition, by supplying the driving power for the stapling blade throughout its driving stroke, rather than only at the beginning of its stroke and depending upon momentum as in the case of a single-pulse operation, there is less mechanical shock to the blade-actuating mechanism and to other components of the device, and hence less noise. Furthermore, since the total driving power is delivered to the blade in two or more pulses rather than in a single pulse, each of the multiple pulses requires only a fraction of the amount of current required for single-pulse operation. Smaller current results in less heating within the housing 10 and less voltage drop in the power line supplying the stapler.

While the preferred embodiment of the invention has been described, it is of course understood that various changes both in the mechanical configuration, arrangement and size of the parts as well as modifications in the electrical circuit will be obvious to those skilled in the art, and said changes are within the purview of the invention as limited only by the appended claims.

We claim:

1. In an electrically powered stapling device comprising driving means for driving a staple and a solenoid having a solenoid coil and a solenoid armature interconnected with and adapted to move said driving means in a staple-driving direction when electric current is passed through the coil, the improvement comprising an electronic pulser circuit connected to the solenoid and adapted to supply the solenoid with at least two unidirectional current pulses from a source of alternating current supplied to the pulser circuit, said pulses causing said driving means to advance and drive a single staple, said pulser circuit comprising:

a. actuator means for causing actuation of the stapler;

b. window means for defining a beginning time and an end time of a fixed interval in the output cycle of said alternating current source;

c. gate means responsive to said actuator means and said window means to produce a trigger signal during said fixed interval when said actuator means is actuated;

d. means responsive to said gate means for producing an enabling signal having a predetermined duration which extends into at least two alternate half-cycles from said source of alternating current; and e. control means responsive to said enabling signal for passing to said solenoid coil at least two alternate half-cycles from said alternating current source.

2. The improvement according to claim 1, wherein said means for producing an enabling signal comprises:

a. capacitor means;

b. threshold means responsive to said gate means to charge said capacitor means to a predetermined leval in response to actuation of said actuator means during said fixed interval; and c. oscillator means connected to receive the charge from said capacitor means and be powered by the discharge of said capacitor means to produce in response thereto an enabling signal comprising a series of pulses.

3. The improvement according to claim 2, wherein said control means comprises rectifier means which, when enabled, can only pass alternate half-cycles of said source of alternating current having a first polarity and which upon being enabled will remain conductive as long as a current passing through it remains above a minimum value, and wherein said fixed interval is defined during those alternate half-cycles of said source of alternating current having a polarity opposite said first polarity, causing said enabling signal to enable said control means to pass complete alternate half-cycles of said first polarity.

4. The improvement according to claim 3, wherein said pulses are produced for a period of time which is greater than the amount of time remaining in the half-cycle after the end of said fixed interval plus the duration of one cycle but less than the amount of time remaining in said half-cycle after the end of said fixed interval plus the duration of a number of cycles equal to the number of pulses which one wishes to produce to drive said solenoid coil.

5. The improvement according to claim 4, wherein said rectifier means is a silicon controlled rectifier.

6. The improvement according to claim 2, wherein said window means comprises:

a. first rectifier means coupled to said source of alternating current for providing a first signal;

b. delay means coupled to said source of alternating current for providing a delayed signal;

c. second rectifier means coupled to said delay means for rectifying said delayed signal whereby said gate means is responsive to said first signal and said rectified delayed signal to produce said enabling signal in response to the coincidence of minimum amplitudes in said first signal and said rectified delayed signal during actuation of said actuator means.

7. The improvement according to claim 6, wherein said control means comprises rectifier means which, when enabled, can only pass alternate half-cycles of said source of alternating current having a first polarity and which upon being enabled will remain conductive as long as a current passing through it remains above a minimum value, and wherein said fixed interval is defined during those alternate half-cycles of said source of alternating current having a polarity opposite said first polarity, causing said enabling signal to enable said control means to pass complete alternate half-cycles of said first polarity.

8. The improvement according to claim 1 wherein said window means comprises:

a. first rectifier means coupled to said source of alternating current for providing a first signal;

b. delay means coupled to said source of alternating current for providing a delayed signal;

c. second rectifier means coupled to said delay means for rectifying said delayed signal whereby said gate means is responsive to said first signal and said rectified delayed signal to produce said enabling signal in response to the coincidence of minimum amplitudes in said first signal and said rectified delayed signal during actuation of said actuator means.

9. The improvement according to claim 1, further comprising rectifier means connected across the solenoid coil to maintain a continuity in the driving of the staple between pulses.

10. The improvement according to claim 8, wherein said control means comprises rectifier means which, when enabled can only pass alternate half-cycles of said source of alternating current having a first polarity and which upon being enabled will remain conductive as long as a current passing through it remains above a minimum value, and wherein said fixed interval is defined during those alternate half-cycles of said source of alternating current having a polarity opposite said first polarity, causing said enabling signal to enable said control means to pass complete alternate half-cycles of said first polarity.

11. The improvement according to claim 1, wherein said control means comprises rectifier means which is able, when enabled, only to pass alternate half-cycles of said source of alternating current having a first polarity and which upon being enabled will remain conductive as long as a current passing through it remains above a minimum value, and wherein said fixed interval is defined during those alternate half-cycles of said source of alternating current having a polarity opposite said fixed polarity, causing said enabling signal to enable said control means to pass complete alternate half-cycles.

* * * * *